United States Patent
Subramanian et al.

(10) Patent No.: US 8,145,730 B2
(45) Date of Patent: *Mar. 27, 2012

(54) METHOD AND SYSTEM TO TRANSMIT DATA

(75) Inventors: Mahesh Subramanian, San Jose, CA (US); Bill Orcutt, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/839,271

(22) Filed: Jul. 19, 2010

(65) Prior Publication Data

US 2010/0281418 A1    Nov. 4, 2010

Related U.S. Application Data

(63) Continuation of application No. 11/282,028, filed on Nov. 17, 2005, now Pat. No. 7,761,536.

(51) Int. Cl.
*G06F 15/16* (2006.01)
(52) U.S. Cl. .................................. 709/219; 709/229
(58) Field of Classification Search ............... 709/219
See application file for complete search history.

(56) References Cited

U.S. PATENT DOCUMENTS

| | | | |
|---|---|---|---|
| 5,710,884 A | 1/1998 | Dedrick | |
| 5,956,025 A | 9/1999 | Goulden et al. | |
| 6,574,314 B1 | 6/2003 | Martino | |
| 7,024,412 B1 | 4/2006 | Webb et al. | |
| 7,213,027 B1 * | 5/2007 | Kominek et al. | 1/1 |
| 7,275,096 B2 * | 9/2007 | Green | 709/223 |
| 7,761,536 B2 * | 7/2010 | Subramanian et al. | 709/219 |
| 2002/0070980 A1 * | 6/2002 | Le et al. | 345/828 |
| 2002/0103698 A1 * | 8/2002 | Cantrell | 705/14 |
| 2003/0048308 A1 * | 3/2003 | Friedlander | 345/810 |
| 2003/0069874 A1 * | 4/2003 | Hertzog et al. | 707/1 |
| 2003/0093362 A1 | 5/2003 | Tupper et al. | |
| 2003/0163531 A1 * | 8/2003 | Nakajima | 709/206 |
| 2003/0200460 A1 * | 10/2003 | Morota et al. | 713/200 |
| 2004/0006606 A1 * | 1/2004 | Marotta et al. | 709/219 |
| 2005/0086344 A1 * | 4/2005 | Suesserman | 709/227 |
| 2005/0144251 A1 * | 6/2005 | Slate | 709/215 |
| 2005/0198072 A1 | 9/2005 | Iinuma | |
| 2005/0277473 A1 * | 12/2005 | Barry | 463/42 |
| 2006/0168106 A1 | 7/2006 | Rock et al. | |
| 2006/0168285 A1 * | 7/2006 | Nielsen et al. | 709/231 |
| 2007/0130291 A1 | 6/2007 | Subramanian et al. | |
| 2008/0262959 A1 | 10/2008 | Tupper | |

OTHER PUBLICATIONS

"U.S. Appl. No. 11/282,028, Final Office Action mailed Mar. 2, 2009", 11 pgs.

(Continued)

*Primary Examiner* — Thu Ha Nguyen
*Assistant Examiner* — Arvin Eskandarnia
(74) *Attorney, Agent, or Firm* — Schwegman, Lundberg & Woessner, P.A.

(57) ABSTRACT

Methods and systems for transmitting data are disclosed. In one embodiment a user interface module causes a first information field to be presented as part of a graphical user interface, receives information entered in the first information field, and detects that a user has navigated away from the first information field. In response to detecting that the user has navigated away from the information field, a data transmitting module may commence transmitting over a network the information entered in the first information field.

17 Claims, 8 Drawing Sheets

OTHER PUBLICATIONS

"U.S. Appl. No. 11/282,028, Non-Final Office Action mailed Jun. 24, 2009", 14 Pgs.

"U.S. Appl. No. 11/282,028, Non-Final Office Action mailed Oct. 14, 2008", 13 pgs.

"U.S. Appl. No. 11/282,028, Notice of Allowance mailed Mar. 10, 2010", 12 pgs.

"U.S. Appl. No. 11/282,028, Office Action Response filed Jan. 14, 2009 to Office Action mailed Oct. 14, 2008", 12 pgs.

"U.S. Appl. No. 11/282,028, Response filed Oct. 22, 2009 to Non Final Office Action mailed Jun. 24, 2009", 14 pgs.

"U.S. Appl. No. 11/282,028, Response filed Jun. 2, 2009 to Final Office Action mailed Mar. 2, 2009", 9 pgs.

"Chinese Application No. 200610138797.7, Office Action Mailed Apr. 24, 2009", 4 pgs.

"Chinese Application No. 200610138797.7, Office Action mailed Aug. 7, 2009", 3 pgs.

"Chinese Application No. 200610138797.7, Office Action Mailed Oct. 10, 2008", 1 pg.

Garrett, A., "A New Approach to Web Application", Adoptive Path, (Feb. 18, 2005).

Garrett, J. J, et al., "Ajax: A New Approach to Web Applications", [Online]. Retrieved from the Internet: <URL: http://www.javalobby.org/articles/ajax/>, (Feb. 18, 2005).

\* cited by examiner

METHOD AND SYSTEM TO TRANSMIT DATA

RELATED APPLICATIONS

This application is a continuation of U.S. application Ser. No. 11/282,028, entitled "Method and System to Transmit Data," filed Nov. 17, 2005, issuing as U.S. Pat. No. 7,761,536 on Jul. 20, 2010, which is incorporated herein by reference in its entirety.

FIELD

Embodiments relate generally to the technical field of network data communications and, in one example embodiment, to methods and systems to transmit data within a network.

BACKGROUND

There are many situations in which a network user (e.g., a person accessing the Internet) may desire to communicate (e.g. upload or otherwise transmit) a relatively large data file via the network to another client computer or to a server computer.

From example, consider that electronic commerce utilizes the Internet to sell goods and services to customers, and has been increasing in its scope and scale at increasing rates. A seller will typically list an item for sale or auction by inputting information regarding the item for sale into a plurality of information fields using a remote user input device, for example a user computer. The computer is connected to a communications network such as the Internet and when the user has completed inputting the information, data is transmitted to a central server to create the listing.

However, where the amount of data to be transmitted is large, it will be appreciated that the user will wait for some time while the data is transmitted over the network and they receive confirmation that their listing has been successful. This is particularly exaggerated for dial-up and low broadband users.

One example of where this can occur is where the data being transmitted is one or more digital images, video data or audio data to be included in their listing.

Of course, the above is just one example environment in which a user may desire to communicate a relatively large data file via a network (e.g., the Internet). Photo hosting sites on the Internet have been increasing in popularity, and require users to upload multiple digital photographs to a server so that these digital photographs are available to other Internet users and so that a user can order physical prints of the digital photographs.

Other examples of relatively large digital files that a user may wish to communicate over a network include audio and video files. For example, a user may wish to upload an MPEG video to a web site for archiving and availability to other users. Similarly, certain web sites may act as distribution channels for up-and-coming musical artists, and may accordingly allow for the uploading of MP3 files to a web site.

SUMMARY

The below described embodiments are directed to methods and systems to transmit data within a network.

In one aspect, a system to transmit data includes:
a user interface module to prompt a user via a graphical user interface to enter information into a plurality of information fields displayed on the graphical user interface and to receive via a user input device information input by the user for at least one of the information fields; and
a data transmitting module to commence transmitting data over a network after the user has input information for at least one of the information fields before or while the user enters information into at least one other information field.

In another aspect, a method of transmitting data includes:
prompting a user, via a graphical user interface, to enter information into a plurality of information fields displayed on the graphical user interface;
receiving, via a user input device information, input by the user for at least one of the information fields; and
commencing transmitting data over a network after the user has input information for at least one of the information fields before or while the user enters information into at least one other information field.

The details of one or more embodiments are set forth in the accompanying drawings and the description below. Other features will be apparent from the description and drawings, and from the claims.

DETAILED DESCRIPTION

Methods and systems to transmit data within a distributed computer system are described. In the following description, for purposes of explanation, numerous specific details are set forth in order to provide a thorough understanding of the present invention. It will be evident, however, to one skilled in the art that the example embodiments may be practiced without these specific details.

One example embodiment is described in the context of a commerce system, however it will be appreciated that the invention could be implemented in other contexts. Indeed, other example embodiments may be implemented in a wide variety of networking environments in which a data file (or other data structure) requires communication or transmission over a network.

Platform Architecture

Figure 1:
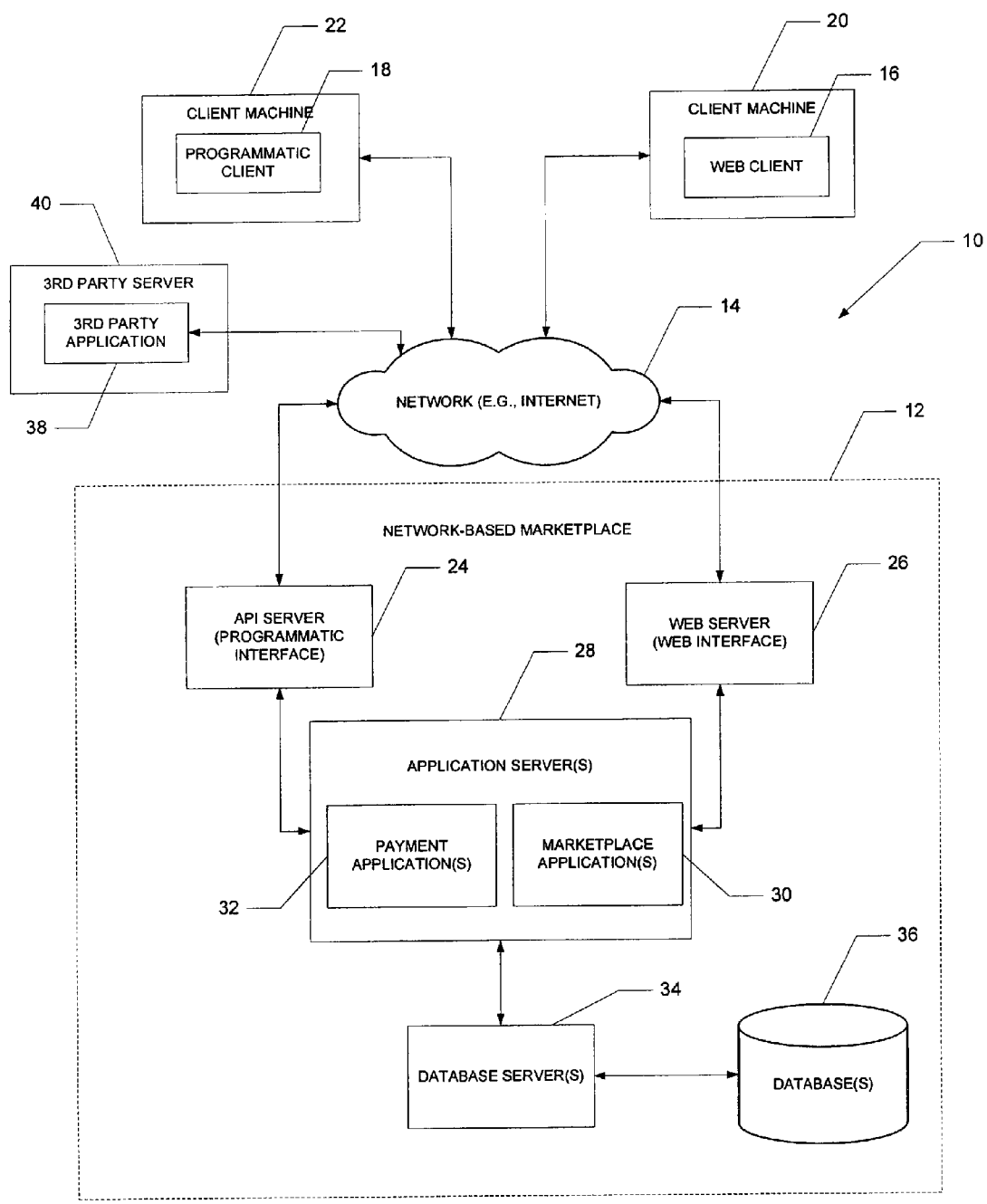
FIG. 1 is a detailed network diagram depicting a system having a client-server architecture, in accordance with one example embodiment.
Figure 2:
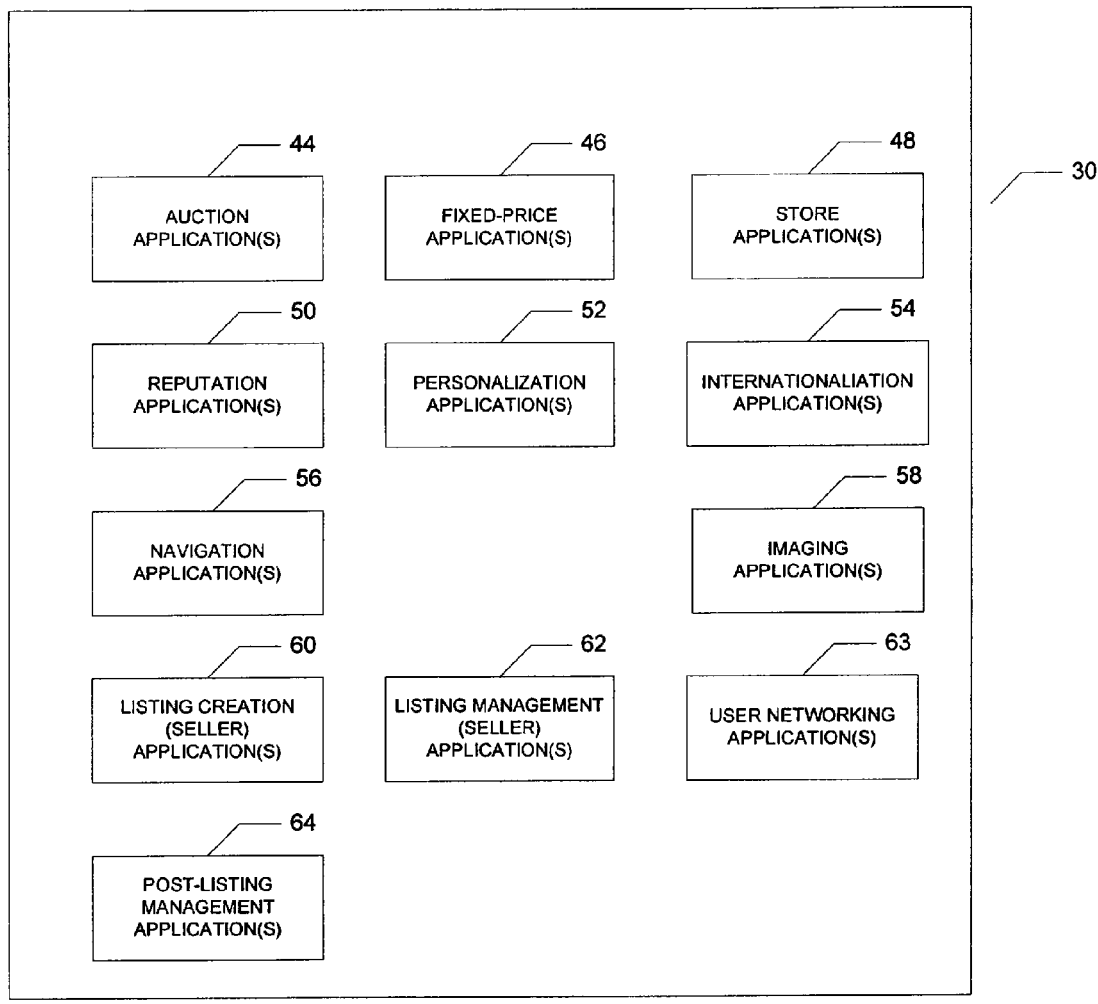
FIG. 2 is a block diagram illustrating multiple commerce system and payment applications, in one example embodiment.

FIG. 1 is a network diagram depicting a system 10, according to one example embodiment, having a client-server architecture. A server platform, in the example form of commerce system 12, provides server-side functionality, via a network 14 (e.g., the Internet) to one or more clients. FIG. 2 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based commerce system 12, an Application Program Interface (API) server 24 and a web server 26 are coupled to, and provide programmatic and web interfaces respectively to, one or more application servers 28. The application servers 28 host one or more applications (e.g., commerce system applications 30 and payment applications 32.) The application servers 28 are, in turn, shown to be coupled to one or more databases servers 34 that facilitate access to one or more databases 36.

The commerce system applications 30 provide a number of commerce system functions and services to users that access the commerce system 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the commerce system applications 30. While the commerce system and payment applications 30 and 32 are shown in FIG. 1 to both form part of the network-based commerce system 12, it will be appreciated that, in alternative embodiments of the present invention, the payment applications 32 may form part of a payment service that is separate and distinct from the commerce system 12.

Further, while the system 10 shown in FIG. 1 employs a client-server architecture, embodiments of the present invention are of course not limited to such an architecture, and could equally well find application in a distributed, or peer-to-peer, architecture system. The various commerce system and payment applications 30 and 32 could also be implemented as standalone software programs, which do not necessarily have networking capabilities.

The web client 16, it will be appreciated, accesses the various commerce system and payment applications 30 and 32 via the web interface supported by the web server 26. Similarly, the programmatic client 18 accesses the various services and functions provided by the commerce system and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings on the commerce system 12 in an off-line manner, and to perform batch-mode communications between the programmatic client 18 and the network-based commerce system 12. Example embodiments may be deployed either within an interface presented by the web client 16, or the programmatic client 18.

FIG. 1 also illustrates a third party application 38, executing on a third party server machine 40, as having programmatic access to the network-based commerce system 12 via the programmatic interface provided by the API server 24. For example, the third party application 38 may, utilizing information retrieved from the network-based commerce system 12, support one or more features or functions on a website hosted by the third party. The third party website may, for example, provide one or more promotional, commerce system or payment functions that are supported by the relevant applications of the network-based commerce system 12.

Commerce System Applications

FIG. 2 is a block diagram illustrating multiple commerce system and payment applications 30 that, in one example embodiment, are provided as part of the network-based commerce system 12. The commerce system 12 may provide a number of listing and price-setting mechanisms whereby a seller may list goods or services for sale, a buyer can express interest in or indicate a desire to purchase such goods or services, and a price can be set for a transaction pertaining to the goods or services. To this end, the commerce system applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based commerce system 12 to establish, build and maintain reputations, which may be made available and published to potential trading partners. Consider that where, for example, the network-based commerce system 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based commerce system 12 over time. Other potential trading partners may then reference such a reputation for the purposes of assessing credibility and trustworthiness.

Personalization applications 52 allow users of the commerce system 12 to personalize various aspects of their interactions with the commerce system 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the commerce system 12 and other parties.

In one embodiment, the network-based commerce system 12 may include a one or more internationalization applications 54 that support a number of marketplaces. Each marketplace may be customized, for example, for specific geographic regions. A version of the commerce system 12 may be customized for the United Kingdom, whereas another version of the commerce system 12 may be customized for the United States. Each of these versions may operate as an independent commerce system, or may be customized (or internationalized) presentations of a common underlying commerce system.

Navigation of the network based-commerce system 12 may be facilitated by one or more navigation applications 56. For example, a search application enables key word searches of listings published via the commerce system 12. A browse application allows users to browse various category, catalogue, or inventory data structures according to which litmus may be classified within the commerce system 12. Various other navigation applications may be provided to supplement the search and browsing applications.

In order to make listings, available via the network-based commerce system 12, as visually informing and attractive as possible, the commerce system applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services that they wish to transact via the commerce system 12, and listing management applications 62 allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. Example embodiment of the present invention may be deployed as part of one or more listing creation applications 60, so as to enable sellers to efficiently upload digital files (e.g., image, video or audio data files) for inclusion within listing information published by the commerce system 12.

One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Data Structures

Figure 3:
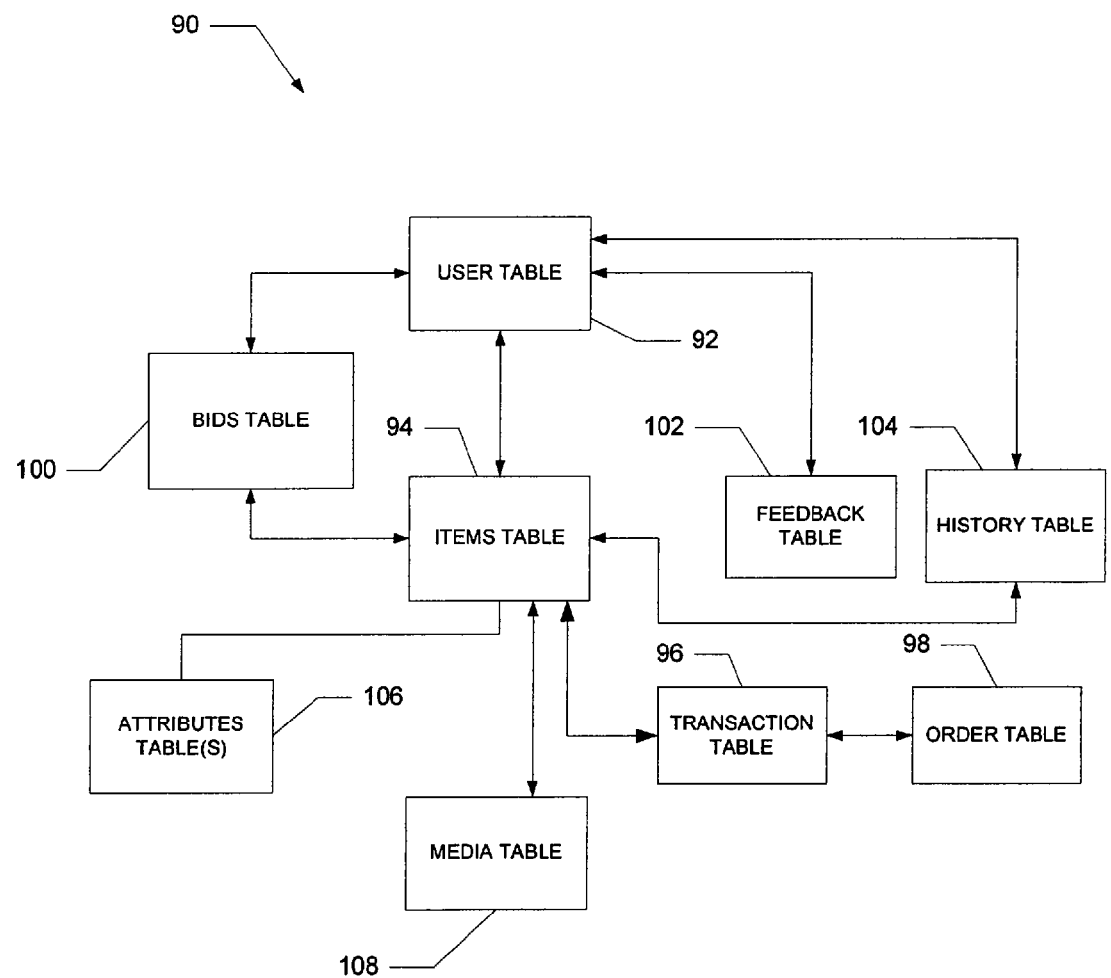
FIG. 3 is a high-level entity-relationship diagram, in accordance with an example embodiment.

FIG. 3 is a high-level entity-relationship diagram, illustrating various tables 90 that may be maintained within the databases 36, and that are utilized by and support the commerce system and payment applications 30 and 32. A user table 92 contains a record for each registered user of the network-based commerce system 12, and may include identifier, address and financial instrument information pertaining to each such registered user. A user may, it will be appreciated, operate as a seller, a buyer, or both, within the network-based commerce system 12. In one example embodiment, a buyer may be a user that has accumulated value (e.g., commercial or proprietary currency), and is then able to exchange the accumulated value for items that are offered for sale by the network-based commerce system 12.

The tables 90 also include an items table 94 in which are maintained item records for goods and services that are available to be, or have been, transacted via the commerce system 12. Each item record within the items table 94 may further-more be linked to one or more user records within the user table 92, so as to associate a seller and one or more actual or potential buyers with each item record.

A transaction table 96 contains a record for each transaction (e.g., a purchase transaction) pertaining to items for which records exist within the items table 94.

An order table 98 is populated with order records, each order record being associated with an order. Each order, in turn, may be with respect to one or more transactions for which records exist within the transactions table 96.

Bid records within a bids table 100 each relate to a bid received at the network-based commerce system 12 in connection with an auction-format listing supported by an auction application 44. A feedback table 102 is utilized by one or more reputation applications 50, in one example embodiment, to construct and maintain reputation information concerning users. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

The tables 90 also include a media table 108, which is linked to the items table 94, to store digital media files associated with item information maintained within items table 94. Specifically, the digital media files may comprise image, video or audio files that are included within, or accessible via, a listing to provide further information pertinent to a particular listing. It will be appreciated that, relative to text information that may be included within the items table 94, the digital media files within the media table 108 may be relatively large and accordingly require additional time and resources to upload to the commerce system 12 from a programmatic client 18 or a web client 16.

For a seller to list an offering for sale or auction on the network based commerce system 12, the seller will typically access the commerce system 12 using a programmatic client 18 or web client 16.

The clients 18 and 16 are accessed by the user via respective graphical user interface of a user's computer, for example, and these prompt a user to enter information into a plurality of fields displayed on the graphical user interface.

The user then inputs information using a user input device which is received by the programmatic client 18 or the web client 16 and then transmitted over the network 14 to the commerce system 12.

The information which the user will want to input will typically be information including the user's identification (otherwise referred to as the seller's identification) and information relating to offering identification, typically with price information.

The information may also include a digital image, audio data or video data which the user wants to transmit to the network-based commerce system 12 for inclusion within, or access via, the listing.

It will be appreciated that some of the information which needs to be transmitted translates to a large amount of data to be transmitted over the network 14 and if the user has network access with limitations, the transmission of large data could be time consuming. This slows down the listing process and hampers the user experience.

To address this, the transmitting of data over the network is commenced after the user has input information for at least one of the information fields before or while the user enters information into at least one other information field.

In order to facilitate this, the user may be prompted to enter information into the information field which would itself typically amount to a larger amount of data being transmitted, or may identify a relatively larger amount of information stored on a client machine for transmission to the commerce system 12. Thus, the user is first prompted to enter information relating to a digital image, audio data or video data. Such data is then transmitted while the user completes the remainder of the information fields.

Figure 4:
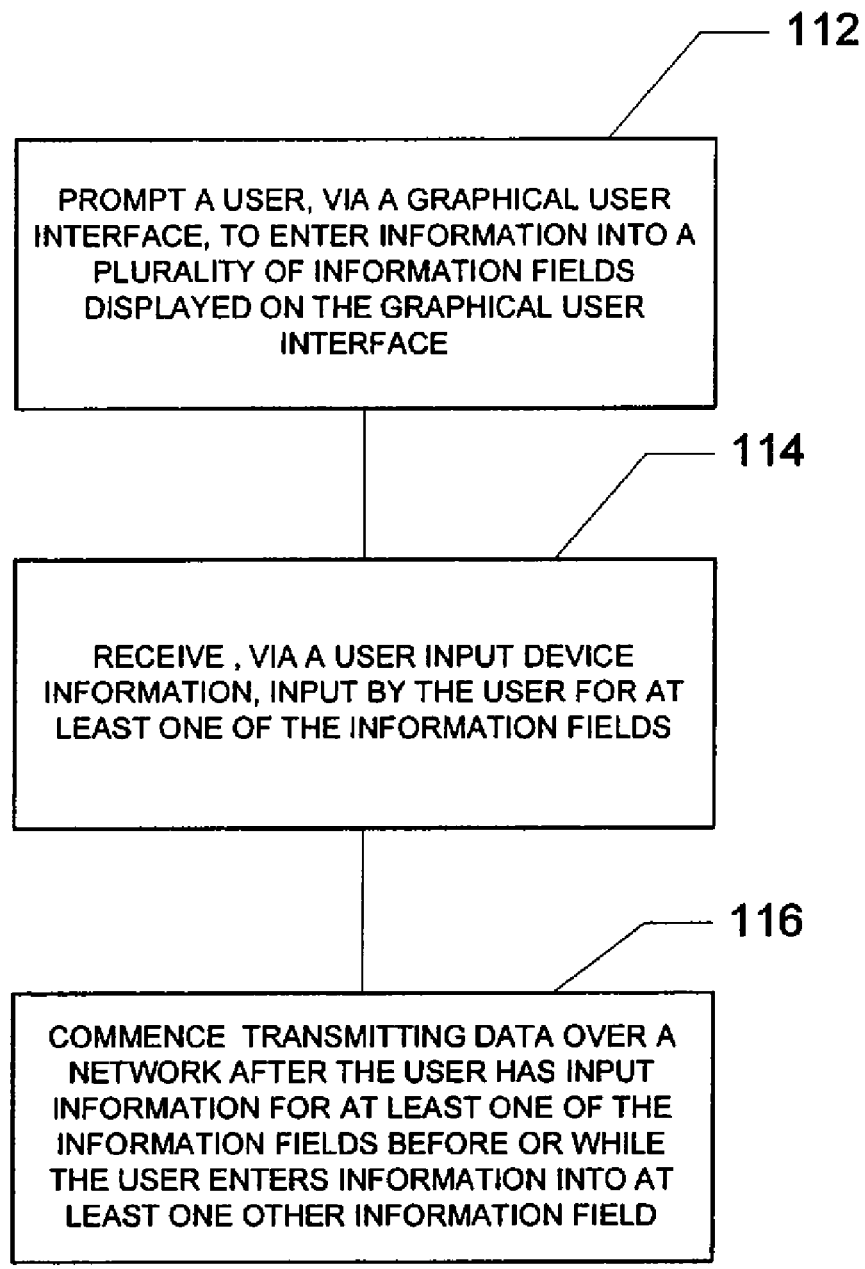
FIG. 4 is another network diagram depicting a system for transmitting data over a network, in accordance with an example embodiment.

Referring to FIG. 4, a user is prompted (operation 112) via a graphical user interface (e.g., presenting buying the web client 16 or the programmatic client 18) to enter information into a plurality of information fields displayed on the graphical user interface. The entered information is then received (operation 114), via a user input device that the client computer for at least one of the information fields.

The transmission of data over a network commences (operation 116) after the user has input information for at least one of the information fields, and before or while the user enters information into at least one other information field.

In one example, the user is prompted to enter a transmit instruction, for example via an enter option on the graphical user interface.

In another example the web client 16 or programmatic client 18 detects that the user has completed the input of information for at least one of the information fields before commencing a transmission of the data over the network. This can be accomplished by detecting when the user navigates away from the field and moves onto another field. In one implementation this could be accomplished using a Java Applet, as described in further detailed below.

It will be appreciated that the process of transmitting data after the user has completed the input of information for at least one of the information fields can be repeated a number of times while the user fills in a plurality of data fields. Thus, a user may be entering data relating to a plurality of images wherein, after the user navigates away from an information field for entering a first image to an information field for entering a second image, the first image will commence transmitting. When the user navigates away from the information field for entering the second image to an information field for entering a third image, the second image will commence transmitting and so forth.

The information input could be information relating to at least one of a digital image, video data and audio data stored in a memory device accessible by a client computer, in which case the data transmitted is data relating to at least one of the digital image, video data and audio data.

The input information for example may identify a storage location at which at least one of the digital image, video data and audio data is stored.

As the example embodiment is within the context of an electronic commerce system, the information input will typically be information detailing an online listing. Such information may include seller identification information and offering identification information, in addition to the digital image. The digital image may be a digital image of an offering.

Figure 5:
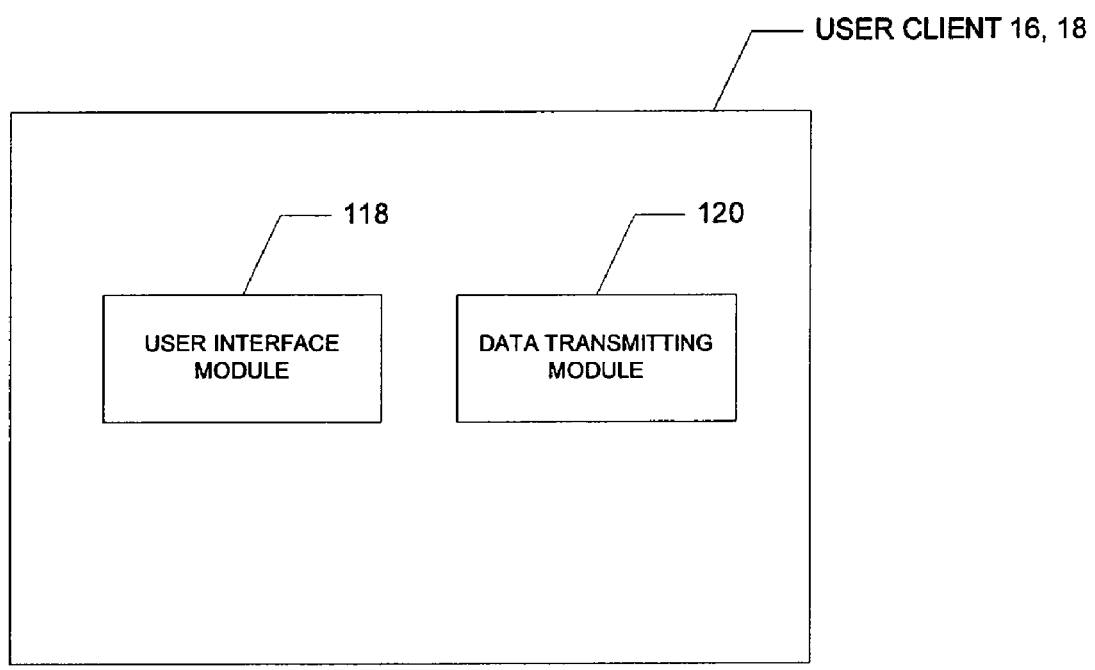
FIG. 5 is an example method for transmitting data over a network.

An example system to implement the abovementioned method is shown in FIG. 5 and includes a user interface module 118 to prompt a user via the graphical user interface to enter the information into the plurality of information fields and to receive via a user input device information input by the user for at least one of the information fields.

The system further includes a data transmitting module 120 to commerce transmitting data over a network (e.g., the Internet) after the user has input information for at least one of the information fields before or while the user enters information into at least one other information field.

In one example, the system is implemented using a machine readable machine having instructions that, when executed by a machine, cause the machine to perform the method described herein.

Figure 6:
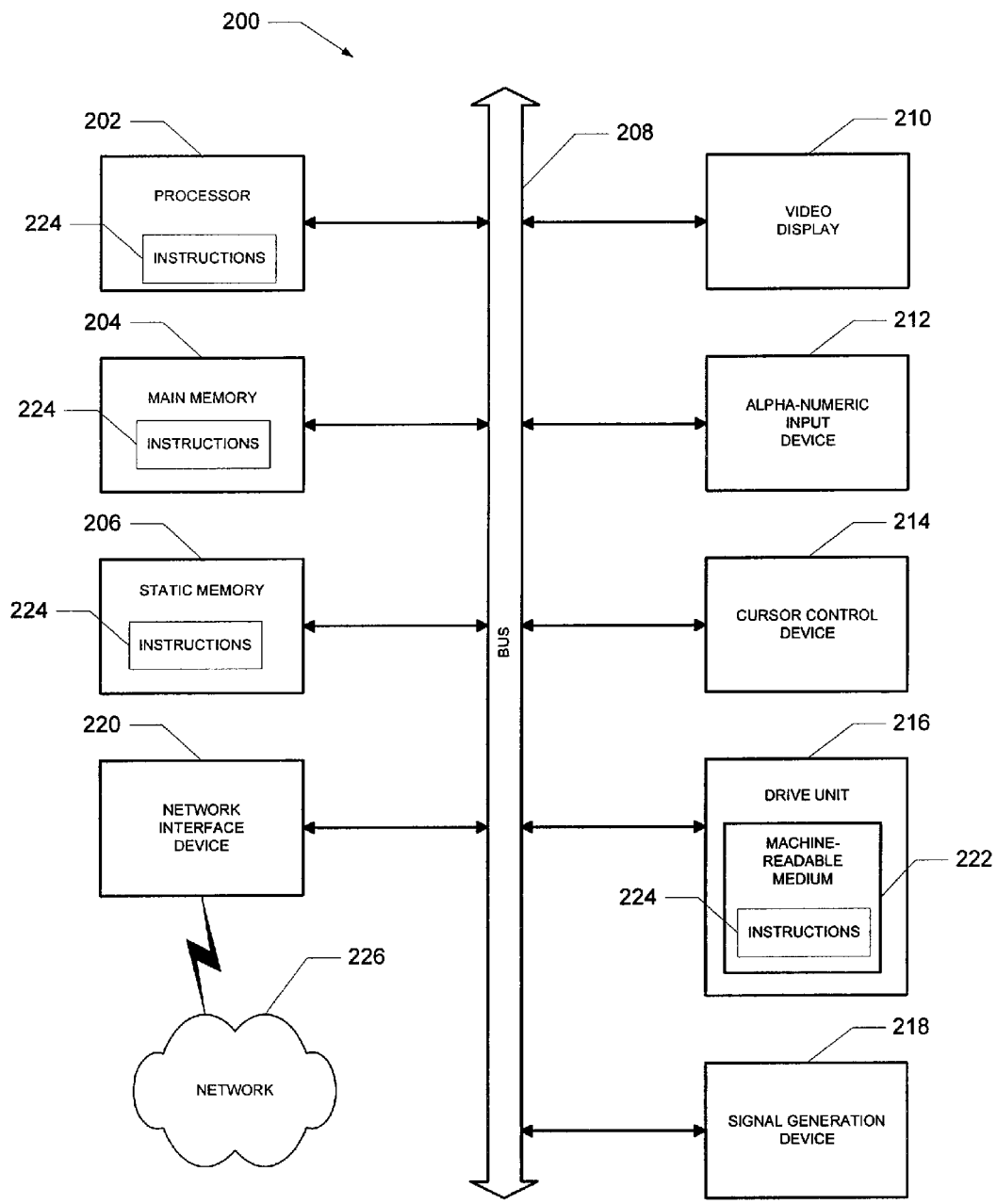
FIG. 6 shows a diagrammatic representation of machine in the example form of a computer system within which instructions, for causing the machine to perform any one or more of the methodologies discussed herein, may be executed.

FIG. 6 shows a diagrammatic representation of machine in the example form of a computer system 200 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 200 includes a processor 202 (e.g., a central processing unit (CPU) a graphics processing unit (GPU) or both), a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

A disk drive unit 216 includes a machine-readable medium 222 on which is stored one or more sets of instructions (e.g., software 224) embodying any one or more of the methodologies or functions described herein. The software 224 may also reside, completely or at least partially, within the main memory 204 and/or within the processor 202 during execution thereof by the computer system 200, the main memory 204 and the processor 202 also constituting machine-readable media. The software 224 may further be transmitted or received over a network 226 via the network interface device 220.

While the machine-readable medium 222 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media, and magnetic media.

Although the present embodiments has been described with reference to specific example embodiments, it will be evident that various modifications and changes may be made to these embodiments without departing from the broader spirit and scope of the invention. For example, the various modules described herein may be preformed and created using hardware circuitry (e.g., CMOS based logic circuitry) as well as in software.

For example, the user interface module 118 and the data transmitting module 120 may be embodied using transistors, logic gates, and electrical circuits (e.g., application specific integrated ASIC circuitry). In addition, it will be appreciated that the various operations, processes, and methods disclosed herein may be embodied in a machine-readable medium and/or a machine accessible medium compatible with a data processing system (e.g., a computer system). Accordingly, the specification and drawings are to be regarded in an illustrative rather than a restrictive sense.

Further details are now provided regarding an example embodiment in which a listing creation user interface (e.g., an HTML page), to receive a plurality of listing information items, is generated by the commerce system 12 and communicated to a web client 16. The example embodiment seeks to improve page performance and reduce user wait time on picture upload functionality that enables a user to upload a picture for inclusion within a listing.

Figure 7:
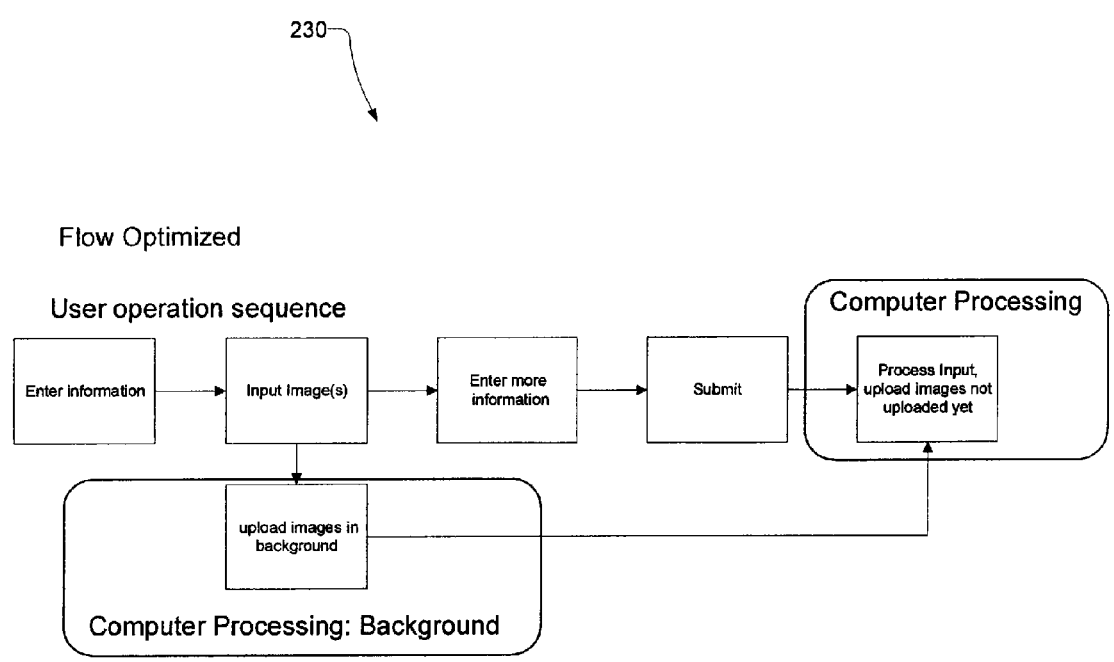
FIG. 7 is a process program illustrating a background upload process, according to an example embodiment.

The example embodiment seeks to use user "think time" to perform expensive upload operations. FIG. 7 illustrates an example upload process 230, which starts in the background as soon as the user enters the picture information identifying a location on a client machine that which a picture to be included within listing is stored. Accordingly, while the user is entering the item description and completing the rest of a listing creation user interface, the upload is progressing in the background with no (or minimal) impact to user operation. By the time the user completes inputting information required by the listing creation user interface and submits this information, the picture upload may have completed or, at the very least, substantially progressed. Accordingly, the bottleneck created by the picture upload function may be reduced and the user experiences an improved response time on a confirm page and is able to efficiently complete a listing creation process Note that the example embodiment detailed above is only one sample implementation. Embodiments of background upload can be implemented in any fashion that will optimize the use of free cycles and user think time.

In the above the above example embodiment, the background upload process 230 may commence as soon as an image is selected. Referring to the example of listing creation user interface illustrated in FIG. 8, for instance, say the user enters information for Picture 1 (either directly into the text control or through the Browse option), and then proceeds to the next control to enter another image information (e.g., Picture 2). In this case, the background upload process 230 starts processing Picture 1 as soon as the user moves to the next control. Accordingly, while the user is selecting the next image (Picture 2), the first image is already being uploaded.

Different example variations of the scheme are possible. For example, for an image upload, there are additional parameters/choices that the user can select which may need to be communicated to a server, along with the image. In this example scenario, the background upload process 230 can be set to defer to the point where all the user inputs pertaining to the image are available.

Alternately, the background upload process 230 can be aborted and re-tried whenever the user chooses to modify the settings that could affect the image upload.

In yet another example variation, the background upload process 230 may be deferred to a later page in a page flow. For instance, if there is a possibility of more user "think time" on a subsequent page, then the background upload process 230 may be deferred to this later page to optimize the free cycles (and user think time).

The processing may even be divided between the two points. In this example, some images may be uploaded on the first page and the rest in the subsequent page in the page flow if doing so does not affect the logic of the page flow. Essentially, example embodiments may be incorporated into any part of the web page flow to optimize image upload during user think time. Same page or different page or work may also be parcelled into different points in the flow etc.

One example embodiment uses JavaScript to perform background uploads. Embodiments may also be implemented using other technologies like Java applets, ActiveX etc. In the example embodiment, the background upload process 230 may execute automatically without any explicit user instruction to do so. The images are, in this example embodiment, uploaded as soon the image information is entered and, for example, the user tabs away to the next control (or the image text box control loses focus). In a further example embodiment, a user may explicitly start the background upload, after which the user may proceed to complete the rest of the form while the background upload is progressing.

Figure 8:
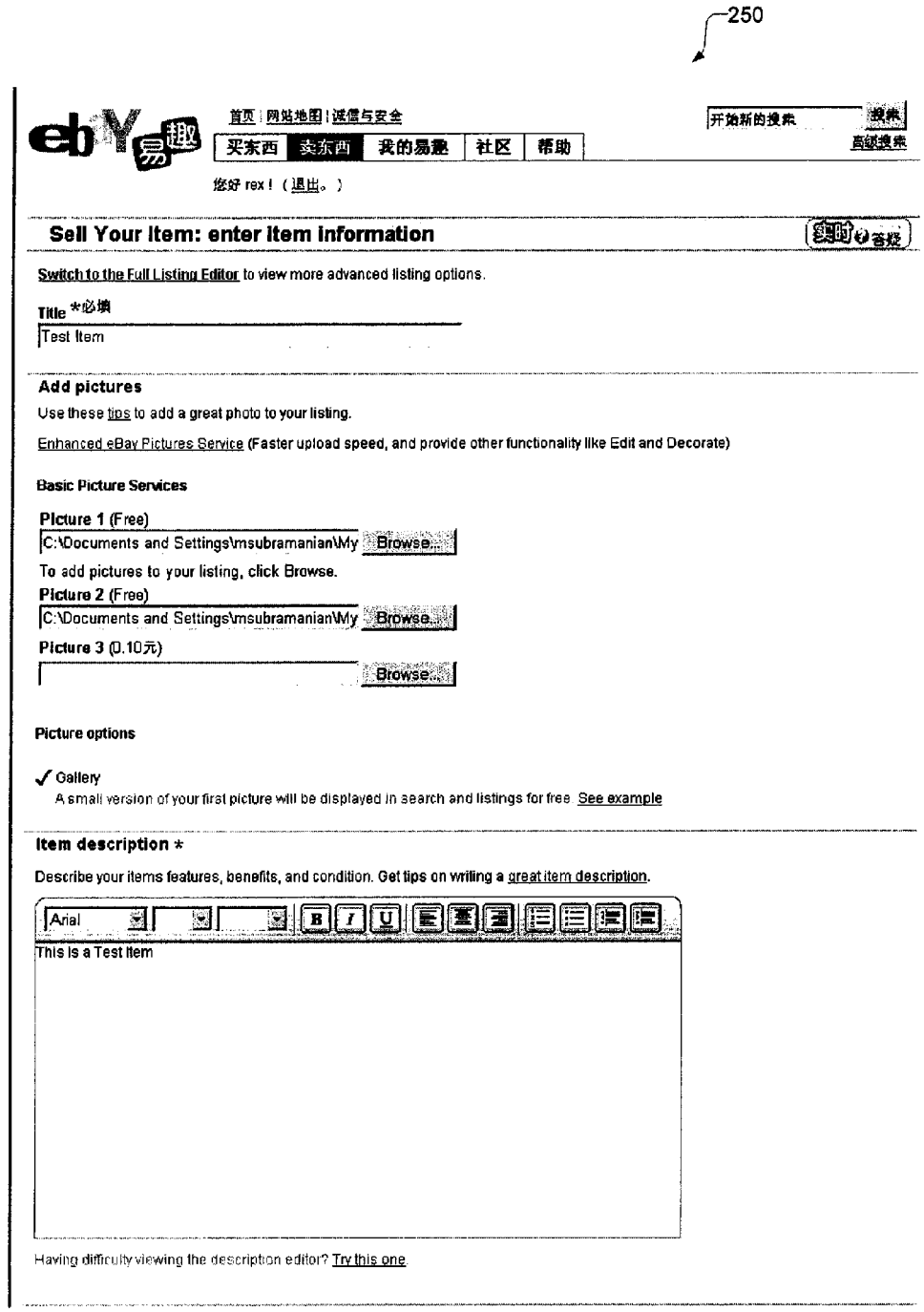
FIG. 8 is a user interface diagram illustrating a listing creation user interface, according to example embodiment, into which a user may input multiple information items to be included in a listing.

The example listing creation user interface 250, shown in FIG. 8, includes text input boxes with a "browse button to allow input of image file location. The interface 250 may also include a "submit" button (e.g., at the end of a form presented in the interface 250) to submit all the information for the listing (e.g., images plus other item data).

The following example code provides a sample implementation of a background upload process 230. Upload is done via a form post in an iframe of 0 pixel height and width. A base user interface (e.g., a base HTML page) of a listing creation page flow contains a button to browse to the directory structure of a client computer via a file input, and an input to display the path to the file chosen. Clicking the "Browse" button opens the file input of the form hidden in the iframe, and the path returned is stored both in the iframe and displayed to the user in the input element in the base page. The form in the iframe is then submitted in the background, via the background upload process 230, to upload the file. When the upload is complete, the relevant server returns a page, a URL of which contains any error code and a URL of the uploaded file. The base page parses this URL to display the uploaded photo.

```
<script>
    //downgrade domain to permit communication between iframe & base page.
    document.domain = "ebay.com";
    // upload state flag
    var gFlag = 0;
    //handle the user file input between base page & iframe & call the form
submit function
```

-continued

```
function browse( )
{
        hiddeniframe.msapost.filepathbutton.click( );
        var basepageinput = document.getElementById('filepath');
        basepageinput.value = hiddeniframe.msapost.filepathbutton.value;
        formSubmit( );
}
//submit the hidden form via javascript
function formSubmit( )
{
        gFlag = 1;
        hiddeniframe.msapost.submit( );
}
//pull the uploaded image url & any error code from the returned page.
function postCompleted( )
{
        if(gFlag==1)
        {
           gFlag = 0;
           var queryStr = unescape(hiddeniframe.location.search);
           var picURL =
queryStr.substring((queryStr.indexOf("?picurl=")+8),queryStr.indexOf("&error"));
           document.images['postedImage'].src = picURL;
        }
}
</script>
<iframe width=0 height=0 src="path/to/hiddenform/page.html " id="hiddeniframe"
onload="window.setTimeout('postCompleted( )',1000);"></iframe>
<input id="filepath" value="" maxlength="128" size="40">
        <input type="button" value="Browse" onclick="browse( );">
```

What is claimed is:

1. A system for transmitting data, the system including:
a processor-implemented user interface module to cause a first information field to be presented as part of a graphical user interface, to receive information entered in the first information field, and to detect that a user has navigated away from the first information field wherein the user interface module is to detect that a user has navigated away from the first information field by detecting that the user has moved on to a second information field to receive information from a user; and
a data transmitting module to automatically commence transmitting over a network the information entered in the first information field in response to the user interface module detecting that the user has navigated away from the first information field and before all the information has been entered into the second information field.

2. The system of claim 1, wherein the received information comprises information relating to a digital file stored in a memory device, and the data transmitting module transmits data relating to the digital file.

3. The system of claim 2, wherein the received information identifies a storage location at which the digital file is stored, and the data transmitting module transmits the digital file.

4. The system of claim 1, wherein the user interface module is to cause the presentation of the second information field in the graphical user interface, and the data transmitting module is to defer transmitting data associated with the second information field until the user interface module detects that the user has navigated away from the first information field.

5. The system of claim 4, wherein the first information field is presented on a first web page and the second information field is presented on a second page.

6. The system of claim 1, wherein the user interface module is further to detect that the user has modified the first information field; and the data transmitting module is further to abort transmitting data over a network in response to detecting that the user has modified the first information field.

7. The system of claim 1, wherein the system for transmitting data is a cellular telephone.

8. A method of transmitting data, the method including:
causing a first information field to be presented in a graphical user interface;
receiving, via a user input device, information entered in the first information field;
detecting, with a processor-implemented user interface module, that a user has navigated away from the first information field, wherein the detecting that a user has navigated away from the first information field comprises detecting that a user has moved onto a second information field to receive information from a user; and
automatically transmitting over a network the information entered in the first information field in response to the user interface module detecting that the user has navigated away from the first information field and before all the information has been entered into the second information field.

9. The method of claim 8, wherein the received information comprises information relating to a digital file stored in a memory device, the method further comprising transmitting data relating to the digital file.

10. The method of claim 9, wherein the received information identities a storage location at which the digital file is stored, the method further comprising transmitting the digital file.

11. The method of claim 8 further comprising:
causing the presentation of the second information field in the graphical user interface; and
deferring transmitting data associated with the second information field until the user interface module detects that the user has navigated away from the first information field.

12. The method of claim 11, wherein the first information field is on a first page and the second information field is on a second page.

13. The method of claim 8 further comprising:
- detecting that the user has modified the first information field; and
- aborting transmitting data over a network in response to detecting that the user has modified the first information field.

14. A non-transitory machine-readable medium having instructions that, when executed by a machine, cause the machine to perform a method including:
- causing a first information field to be presented in a graphical user interface;
- receiving, via a user input device, information entered in the first information field;
- detecting, with a processor-implemented user interface module, that a user has navigated away from the first information field, wherein the detecting that a user has navigated away from the first information field comprises detecting that a user has moved onto a second information field to receive information from a user; and
- automatically transmitting over a network the information entered in the first information field in response to the user interface module detecting that the user has navigated away from the first information field and before all the information has been entered into the second information field.

15. The non-transitory machine-readable medium of claim 14, the instructions to further cause the machine to perform the method including:
- causing the presentation of a second information field in the graphical user interface; and
- deferring transmitting data associated with the second information field until the user interface module detects that the user has navigated away from the first information field.

16. The non-transitory machine-readable medium of claim 14, the instructions to further cause the machine to perform the method including:
- detecting that the user has modified the first information field; and
- aborting transmitting data over a network in response to detecting that the user has modified the first information field.

17. A system for transmitting data, the system including:
- a user interface means for:
  - causing the presentation of a first information field capable of accepting input in a graphical user interface,
  - receiving, via a user input device, information by a user in the first information field, and
  - detecting, using a processor, that the user has navigated away from the first information field, wherein the detecting that a user has navigated away from the first information field comprises detecting that a user has moved onto a second information field to receive information from a user; and
- a data transmitting means for automatically transmitting data over a network in response to detecting that the user has navigated away from the first information field and before all the information has been entered into the second information field.

* * * * *

UNITED STATES PATENT AND TRADEMARK OFFICE
CERTIFICATE OF CORRECTION

PATENT NO. : 8,145,730 B2  
APPLICATION NO. : 12/839271  
DATED : March 27, 2012  
INVENTOR(S) : Mahesh Subramanian et al.

Page 1 of 1

It is certified that error appears in the above-identified patent and that said Letters Patent is hereby corrected as shown below:

On Sheet 2 of 8, Reference Numeral 54, Figure 2, line 1, delete "INTERNATIONALIATION" and insert -- INTERNATIONALIZATION --, therefor.

In column 9, line 41, after "process" insert -- . --.

In column 12, line 58, in Claim 10, delete "identities" and insert -- identifies --, therefor.

Signed and Sealed this  
Third Day of July, 2012

David J. Kappos  
*Director of the United States Patent and Trademark Office*